(12) United States Patent
Wang

(10) Patent No.: US 12,048,390 B2
(45) Date of Patent: Jul. 30, 2024

(54) ON-BOARD MULTI-FUNCTIONAL THERMAL-INSULATION AND EXPLOSION-PROOF PRESSURE STEAMER

(71) Applicant: SHAANXI WEIQI ENERGY TECHNOLOGY CO. LTD, Shaanxi (CN)

(72) Inventor: Yufu Wang, Xianyang (CN)

(73) Assignee: SHAANXI WEIQI ENERGY TECHNOLOGY CO. LTD, Shaanxi (CN)

( * ) Notice: Subject to any disclaimer, the term of this patent is extended or adjusted under 35 U.S.C. 154(b) by 656 days.

(21) Appl. No.: 17/273,215

(22) PCT Filed: Oct. 26, 2018

(86) PCT No.: PCT/CN2018/112079
§ 371 (c)(1),
(2) Date: Mar. 3, 2021

(87) PCT Pub. No.: WO2020/082329
PCT Pub. Date: Apr. 30, 2020

(65) Prior Publication Data
US 2021/0345813 A1 Nov. 11, 2021

(51) Int. Cl.
*A47J 27/04* (2006.01)
*A47J 27/00* (2006.01)
(Continued)

(52) U.S. Cl.
CPC ............. *A47J 27/04* (2013.01); *A47J 27/002* (2013.01); *A47J 27/004* (2013.01);
(Continued)

(58) Field of Classification Search
CPC .... A47J 27/002; A47J 27/004; A47J 27/0813; A47J 27/09; A47J 2027/043; B60S 1/66;
(Continued)

(56) References Cited

U.S. PATENT DOCUMENTS

2018/0125281 A1* 5/2018 Truong et al. .......... A47J 27/04

FOREIGN PATENT DOCUMENTS

| CN | 201254346 Y | * | 6/2009 | ............. B65D 77/28 |
| CN | 201734496 U | * | 2/2011 | ............. A47J 27/05 |

(Continued)

OTHER PUBLICATIONS

Machine translation of CN 201734496 U performed on Dec. 22, 2023, Liu et al. (Year: 2011).*

(Continued)

*Primary Examiner* — Dana Ross
*Assistant Examiner* — Kevin Guanhua Wen
(74) *Attorney, Agent, or Firm* — CBM Patent Consulting, LLC

(57) ABSTRACT

An onboard multi-functional thermal-insulation and explosion-proof pressure steamer, relating to the technical field of heating cooking appliances, and in particular, to the field of cooking appliances mounted on a travelling apparatus, comprising a steamer body and a steamer outer cover covering the top of the steamer body, a steam pot being provided in the steamer body. The steam pot is provided in the steamer body to seal a steam container in the steam pot, and the steam pot is heated by means of the onboard heat energy, heat exchange is performed by means of a heat exchange device to generate high-temperature steam to heat the food material in the steam pot of the steam or to heat the water in a water tank.

24 Claims, 9 Drawing Sheets

(51) Int. Cl.
*A47J 27/08* (2006.01)
*A47J 27/09* (2006.01)
*B60S 1/66* (2006.01)
*F01N 3/02* (2006.01)
*G05D 16/10* (2006.01)

(52) U.S. Cl.
CPC ........... *A47J 27/0813* (2013.01); *A47J 27/09* (2013.01); *B60S 1/66* (2013.01); *F01N 3/0205* (2013.01); *G05D 16/101* (2019.01); *A47J 2027/043* (2013.01)

(58) Field of Classification Search
CPC .......... B60S 1/487; F01N 3/0205; F01N 5/02; G05D 16/101; Y02T 10/12
See application file for complete search history.

(56) References Cited

FOREIGN PATENT DOCUMENTS

| CN | 202118954 | U | * | 1/2012 | ............. | F24B 1/191 |
|----|-----------|---|---|--------|---|------------|
| CN | 203207796 | U | * | 9/2013 | ............. | A47J 27/18 |
| CN | 108168100 | A | * | 6/2018 | ........... | F24H 9/0005 |
| DE | 112013002275 | T5 | * | 3/2015 | ............. | A47J 36/10 |
| EP | 1535553 | A1 | * | 6/2005 | ........... | A47J 27/092 |
| EP | 2532286 | A1 | * | 12/2012 | ............. | A47J 27/04 |
| EP | 2519131 | B1 | * | 1/2017 | ............. | F02M 37/22 |
| KR | 20090100092 | A | * | 9/2009 | ............... | A23B 7/06 |

OTHER PUBLICATIONS

Machine translation of KR 20090100092 A performed on Dec. 22, 2023, Song (Year: 2009).*
Machine translation of CN 202118954 U performed on Dec. 22, 2023, Zhou (Year: 2012).*
Machine translation of EP 2519131 B1 performed on Dec. 26, 2023, Schultz et al. (Year: 2017).*
Machine translation of EP 1535553 A1 performed on Dec. 26, 2023, Seurat et al. (Year: 2005).*
Machine translation of DE 112013002275 T5 performed on Dec. 26, 2023, Kim (Year: 2015).*
Machine translation of CN 203207796 U performed on Dec. 26, 2023, Zhang (Year: 2013).*
Machine translation of EP 2532286 A1 performed on Dec. 27, 2023, Vulliermet (Year: 2012).*
Machine translation of CN 108168100 A performed on Dec. 27, 2023, Unannounced (Year: 2018).*
Machine translation of CN 201254346 Y performed on Dec. 27, 2023, Li (Year: 2009).*

* cited by examiner

ON-BOARD MULTI-FUNCTIONAL THERMAL-INSULATION AND EXPLOSION-PROOF PRESSURE STEAMER

TECHNICAL FIELD

The invention is an onboard multi-functional thermal-insulation and explosion-proof pressure steamer that relates to the technical field of heating cooking appliances, and in particular, to the field of cooking appliances mounted on a travelling apparatus.

BACKGROUND ART

The kitchen steamer is an intelligent modern kitchen cooking apparatus with beautiful appearance, simple operation, clean and energy-saving and large capacity, which makes the food material heated and cooked by the dynamic steam balance technology and can retain the original nutrient contents of the food material throughout the cooking process. The existing kitchen steamer products are generally mounted in the kitchen cabinet according to the needs of users and the actual situation of the kitchen, and are combined with other kitchen appliances for use and installation.

Self-driving travel is a remarkable economic phenomenon in recent years. Various kinds of self-driving travel have attracted a large number of tourists and given rise to a large body of in-depth research and substantial investment in self-driving travel. It's really challenging to get a fresh hot meal anytime and anywhere during long distance driving. The poor thermal efficiency of existing outdoor cooking appliances is only possible to make some boiled water for instant noodles.

SUMMARY

In order to solve the above problems, the invention provides an onboard multi-functional thermal-insulation and explosion-proof pressure steamer, which can solve the hot water problems of eating and drinking on the outside, and has the advantages of simple structure and convenient use.

An onboard multi-functional thermal-insulation and explosion-proof pressure steamer, comprising a steamer body and a steamer outer cover covering the top of the steamer body, wherein a steam pot is provided in the steamer body, multiple steam containers with an open and hollow end are provided in the steam pot, the steam containers are stacked from top to bottom orderly and sealed together, the steam container on the top is covered with a steam container cover, and the steam container at the bottom is connected with the steam pot through a steam container elastic base;

the steam pot is also covered with a steam pot cover; and
a heating device is connected to the steam pot.

Preferably, the steam pot comprises a steam pot body outer layer and a steam pot body inner layer. The steam pot body outer layer is sheathed on the exterior of the steam pot body inner layer, the top of the steam pot body inner layer is connected with a broken bridge on the top of the steam pot body outer layer, and an area between the steam pot body outer layer and the steam pot body inner layer is arranged for vacuum. A steam pot cooling ring is sheathed on the exterior of the steam pot body inner layer, forming a closed cooling area between the steam pot body inner layer and the steam pot cooling ring. The cooling area is connected with a refrigerator via a steam pipe passing through the steam pot body outer layer.

Preferably, the steamer body is also provided with a remaining steam discharge outlet and a steam exhaust port, an extractor fan is provided in the remaining steam discharge outlet, which is connected with a steam collection ring provided on the steam pot and located above the steam pot cover. The steam collection ring is hollow and annular, and fixedly provided on the top of the steam pot body inner layer, and an opening of the steam collection ring is provided on an annular surface of the steam collection ring facing the center of the steam pot body inner layer. The steam pot body inner layer is connected with the interior of the steam collection ring through an opening of the steam collection ring, and the steam exhaust port of the steam collection ring provided on the steam collection ring is connected with the remaining steam discharge outlet;

the steam exhaust port is connected with a broken bridge in the steam pot through an exhaust steam pipe, and a pressure regulating valve is provided on the steam exhaust port;

also comprising a steam pot inlet, wherein the steam pot inlet is provided in the center at the bottom of the steam pot, and is connected with a broken bridge in the steam pot by passing through the steam pot body outer layer and the steam pot body inner layer.

Preferably, the pressure regulating valve comprises a hollow and columnar valve seat and a pressure regulating rod. One end of the valve seat is connected with a valve seat gland, and the other end thereof is connected with a pressure regulating seat. The valve seat gland and pressure regulating seat are sealed and connected with an inner wall of the valve seat, an internal thread through-hole is provided on the valve seat gland, and one end of the pressure regulating rod is extended into the valve seat and is in threaded connection with the internal thread through-hole on the valve seat;

a pressure regulating valve element is slidably provided in the valve seat, a bump is provided on one end of the pressure regulating valve element facing the pressure regulating rod, and a blind hole is provided on the bump. A pressure regulating rod gland is sheathed on the bump, fixedly connected with the bump, and slidably connected with the valve seat. One end of the pressure regulating rod, which is extended into the valve seat, passes through the through-hole on the pressure regulating rod gland and is movably provided in the blind hole. A limiting shaft shoulder is provided on the pressure regulating rod, with a diameter greater than that of the through-hole on the pressure regulating rod gland. The limiting shaft shoulder is located in the area enclosed by the pressure regulating rod gland and the pressure regulating valve element;

two annular regulating valve sealing rings are provided and sheathed on the pressure regulating valve element, and a steam inlet annular groove is provided on the pressure regulating valve element between the two annular regulating valve sealing rings. The central axis of the steam inlet annular groove and the central axis of the valve element are on the same straight line. Multiple steam inlet channels are provided in the steam inlet annular groove and all the central axes of the steam inlet channels are in the same plane, perpendicular to the central axis of the valve element. A steam inlet is provided on the valve seat and connected with the steam inlet annular groove;

a steam flow channel is provided on one end of the pressure regulating valve element away from the pressure regulating rod, and the steam flow channel is connected with the steam inlet channel;

a steam exhaust chamber is provided on one end of the valve seat away from the pressure regulating rod, and a steam exhaust valve element and a spring are provided in the steam exhaust chamber; a steam exhaust sealing gasket is fixedly provided on the steam exhaust valve element and arranged against the steam flow channel, and the steam exhaust chamber is connected with the steam flow channel through the steam exhaust sealing gasket;

a bolt hole is provided in the center of the pressure regulating seat, a stroke regulating bolt passes through the bolt hole and is provided opposite to the steam exhaust valve element, one end of the spring is arranged against the steam exhaust valve element, and the other end thereof is arranged against the pressure regulating seat; a regulating valve steam exhaust port is provided on one end of the valve seat connected with the pressure regulating seat, and the regulating valve steam exhaust port is connected with the steam exhaust chamber through a steam exhaust channel on the pressure regulating seat.

Preferably, a steam container cover comprises a steam container body and fasteners provided on four sides of the steam container body, fastener grooves are provided on four sides of an open end of the steam container, and the fasteners are matched with the fastener grooves.

Preferably, the steam pot cover comprises a pot cover body, a pot cover locking body is connected to the pot cover body, multiple chutes are provided on the pot cover locking body, locking rods are slidably provided in the chutes, the locking rods are evenly arranged on the pot cover locking body, and the locking rods are provided from the center of the pot cover locking body to the edge of the pot cover locking body;

the top of the steam pot is provided with clamping grooves with the same number as the locking rods, the clamping grooves are located in the same horizontal plane, and the locking rods are matched and connected with the clamping grooves;

one end of the locking rod is extended out from the pot cover locking body and is clamped in the clamping groove, the other end thereof is connected with a driving device, and the driving device drives the locking rods to extend or retract synchronously.

Preferably, the driving device comprises a locking knob, driving grooves with the same number as the chutes are provided on the locking knob, one end of the locking rod close to the center of the pot cover locking body is connected with the driving groove through a locking sliding pin, the locking sliding pin is rotatably connected with the locking rod and slidably provided in the driving groove, and the central axes of the locking sliding pin are vertical to the plane of the pot cover locking body;

the driving groove is provided from the center to the edge of the locking knob, the locking knob is rotated, and the locking sliding pin slides in the driving groove to drive the locking rods to extend or retract.

Preferably, the onboard multi-functional thermal-insulation and explosion-proof pressure steamer also comprises a pot cover locking lid, wherein the pot cover locking lid is connected with the pot cover locking body through a regulating bolt provided at the center of the pot cover locking lid, and the rotating central line of the locking knob and the rotating central line of the regulating bolt are on the same straight line;

the regulating bolt is in threaded connection with the pot cover locking body after passing through the pot cover locking lid and the locking knob in turn, the pot cover body is slidably connected with the pot cover locking body through multiple sliding connecting pins, a limiting bump is respectively provided on both ends of the sliding connecting pin, and the pot cover body and the pot cover locking body are located between two limiting bumps on the same sliding connecting pin;

a blind hole is provided at the center of the pot cover body, one end of the regulating bolt passing through the pot cover locking body is opposite to the blind hole; when the regulating bolt is extended out towards the pot cover body, the regulating bolt is arranged against the blind hole;

the pot cover locking lid, the locking knob and the pot cover locking body are sheathed on the regulating bolt;

a rotary operating rod is provided on the locking knob, an arc rotary operating groove is provided on the position of the pot cover locking lid corresponding to the rotary operating rod, one end of the rotary operating rod is fixedly connected with the locking knob, and the other end thereof is provided towards the pot cover locking lid and is extended out from the rotary operating groove; the rotary operating rod slides along the rotary operating groove to drive the locking knob to rotate.

Preferably, guide holes with the same number as the chutes are fixedly provided at the edge of the pot cover locking body, and one end of the locking rod away from the center of the pot cover locking body is slidably provided in the guide hole.

Preferably, the onboard multi-functional thermal-insulation and explosion-proof pressure steamer also comprises a locking safety pin, wherein the locking safety pin comprises a movable pin and an anti-release seat. One end of the movable pin is connected with a silicon rubber expansion and sealing gasket, the anti-release seat is fixedly connected with the pot cover body, the silicon rubber expansion and sealing gasket is provided in the area enclosed by the anti-release seat and the pot cover body, and this area is connected with the interior of the steam pot; the other end of the movable pin is vertically extended out towards the pot cover locking body. A through-hole is provided on the pot cover locking body and located in a chute, a safety hole is provided on the locking rod in this chute, and the movable pin is matched with the safety hole. When the steam pressure in the steam pot rises, the movable pin is squeezed by the silicon rubber expansion and sealing gasket and extended out towards the locking rod; when the steam pressure in the steam pot drops, the silicon rubber expansion and sealing gasket is reset, and the movable pin is retracted.

Preferably, an annular sealing ring is provided between the pot cover body and the steam pot.

Preferably, a water tank with an open and hollow upper end is also provided in the steamer body, a water tank cover is provided on the open end of the water tank, and both the water tank and the steam pot are located in the area enclosed by the steamer body and the steamer outer cover;

a water level gauge mounting hole, a temperature measuring probe hole, a drinking water pipe hole and a water filling nozzle are provided on the water tank cover, a water level gauge is mounted in the water level gauge mounting hole, and a temperature measuring probe is mounted in the temperature measuring probe hole;

a telescopic drinking water pipe is provided in the drinking water pipe hole, and the telescopic drinking water pipe comprises a telescopic outer pipe and a silicon rubber hose, wherein the telescopic outer pipe is sheathed on the exterior of the silicon rubber hose with one end extended out of the water tank as a water outlet end and the other end thereof located in the water tank as a water inlet end. A limiting bump is provided on the telescopic outer pipe and arranged against the water tank through a telescopic spring, and the limiting bump is provided in the water tank. One end of the silicon rubber hose is connected with a water outlet end of the telescopic outer pipe, and the other end thereof is connected with the interior of the water tank through a first water pump;

the water tank is also connected with the heating device.

Preferably, the water tank comprises a water tank outer layer and a water tank inner layer, the water tank outer layer is sheathed on the exterior of the water tank inner layer, and the top of the water tank inner layer is sealed and connected with that of the water tank outer layer;

the area enclosed by the water tank inner layer and the water tank outer layer is a vacuum area.

Preferably, a water tank inlet is provided on the bottom of the water tank, the water tank inlet is connected with the interior of the water tank, and the water tank inlet is connected with the heating device.

Preferably, a temperature measuring hole is also provided on the water tank cover, a temperature measuring probe is provided in the temperature measuring hole, and one end of the temperature measuring probe is extended into the water tank.

Preferably, the steamer outer cover comprises an annular steamer outer cover seat, a steam pot outer cover body covering the steamer outer cover seat, and a water tank outer cover body;

the steamer outer cover seat is in matched connection with the steamer body, a partition plate is provided in the steamer outer cover seat, the area in the steamer outer cover seat is divided into an area of the steam pot and an area of the water tank by means of the partition plate; the area of the steam pot is covered with the steam pot outer cover body, and the area of the water tank is covered with the water tank outer cover body;

a bump is provided on the partition plate, a rotating shaft is rotatably connected to the bump, and both the water tank outer cover body and the steam pot outer cover body are rotatably connected with the rotating shaft;

two ends of the rotating shaft are rotatably connected with two corresponding sidewalls of the steamer outer cover seat, respectively; and two ends of the partition plate are also fixedly connected with two corresponding sidewalls of the steamer outer cover seat, respectively.

Preferably, the onboard multi-functional thermal-insulation and explosion-proof pressure steamer also comprises a car washing water tank, a car washing nozzle connecting pipe is connected to the car washing water tank, and a second water pump is provided on the car washing nozzle connecting pipe;

a bendable heat exchange tube is provided in the car washing water tank, and the heat exchange tube is connected with the heating device.

Preferably, one end of the heating device is connected with the water tank through a heating device water inlet connecting pipe, the other end thereof is connected with the steam pot inlet through a steam pot steam heating connecting pipe, and a first solenoid valve is provided on the steam pot steam heating connecting pipe;

a water tank steam heating connecting pipe is connected to the steam pot steam heating connecting pipe through a tee, and one end of the water tank steam heating connecting pipe away from the steam pot steam heating connecting pipe is connected with the water tank inlet;

a steam heating outlet is provided on the top of the water tank, the steam heating outlet is connected with one end of the heat exchange tube through a car washing water tank remaining steam return pipe, the other end of the heat exchange tube is connected with the steam pot steam heating connecting pipe through a car washing water tank heating connecting pipe, and a third solenoid valve is provided on the car washing water tank heating connecting pipe;

the first water pump is provided on the heating device water inlet connecting pipe;

also comprising a drinking boiled water connecting pipe, one end of the drinking boiled water connecting pipe is connected with the heating device water inlet connecting pipe between the first water pump and the heating device, the other end thereof is extended into the water tank and is connected with one end of the silicon rubber hose away from the water outlet end of a telescopic outer pipe, and a fourth solenoid valve is provided on the drinking boiled water connecting pipe.

Preferably, the heating device is an internal combination engine exhaust gas remaining heat extraction device that is connected with an internal combination engine exhaust device.

Preferably, the internal combination engine exhaust gas remaining heat extraction device comprises multiple branch pipes, a flange plate is provided between the internal combination engine and the internal combination engine exhaust device, one end of each of the branch pipes is connected with a gas combination pipe, and the other end thereof is connected with the flange plate; a heat conversion device is provided in each branch pipe, a one-way flow heating channel and a high-temperature exhaust gas channel closed to each other are provided in the heat conversion device, and heating channels in the branch pipes are connected successively to form a water vapor channel;

one end of the water vapor channel is connected with the water tank through the heating device water inlet connecting pipe, and the other end thereof is connected with the steam pot steam heating connecting pipe.

Preferably, the heat conversion device is characterized into that a one-way flow heating channel and a high-temperature exhaust gas channel independent from each other are provided in a double-deck chamber, the surface of the high-temperature exhaust gas channel has a fin-like structure, and the water vapor channel has a return-type structure.

Preferably, the heat conversion device has a wedge heat exchange structure, the high-temperature exhaust gas channel surface has an annular fin-like structure, and the water vapor channel is provided at the tube pass, and the high-temperature exhaust gas channel is provided at the center and the shell pass.

Preferably, the tube pass shape of the water vapor channel has a sinusoidal wave surrounding structure.

Or preferably, the heat conversion device is a cylindrical tubular heat conversion device, and two ends thereof have a tapered structure, the water vapor channel is provided between the heat conversion device heating outer layer and the heat conversion device heating inner layer, the water vapor channel is a rectangular water vapor channel, the surfaces of the heat conversion device heating outer layer and the heat conversion device heating inner layer have a fin-like structure, the tube pass of the water vapor channel has an S-curve surrounding shape, the water vapor channel is provided at the tube pass, and the high-temperature exhaust gas channel is provided at an inner exhaust gas flow chamber and an outer exhaust gas flow chamber in the heat conversion device.

Or preferably, the heat conversion device is rectangular, the water vapor channel is provided in the heat conversion device, a plate fin-like heating outer layer of the heat conversion device is provided on the upper and lower parts of the water vapor channel respectively, the tube pass of the water vapor channel has a plate return-type shape, the water vapor channel is provided at the tube pass, and the high-temperature exhaust gas channel is provided at the outer exhaust gas flow chamber between the heat conversion device heating outer layer and the branch pipe.

Preferably, the heating device is an electric heating steam generator, the electric heating steam generator comprises a steam shell and an electric heating pipe provided in the steam shell, a water inlet and a steam outlet are provided on the steam shell, the steam outlet is connected with the steam pot steam heating connecting pipe, and the water inlet is connected with the heating device water inlet connecting pipe.

The invention features simple structure and convenient use. The steam pot is provided in the steamer body to seal a steam container in the steam pot, and the steam pot is heated by the onboard heat energy, the invention uses high-temperature exhaust gas from the internal combustion engine as the heat source, heat exchange is performed by means of a heat exchange device to generate high-temperature steam to heat the food material in the steam pot of the steam or to heat the water in a water tank, having the advantages of high efficiency and energy-saving, safety and sanitation, and quick and convenient use, etc. A steam pot cover has a double-layer thermal-insulation structure, and by means of the adjustment of a bolt, a locking rod is brought into close connection with the steamer body, thereby achieving the explosion-proof purpose; in addition, the steam pot and the steam pot cover are sealed by means of an annular sealing ring, and a positive or negative pressure can be formed in the steam pot, the positive pressure accelerates cooking the food material, and the negative pressure facilitates preserving the food material.

SIGNS OF DRAWINGS

Figure 1:
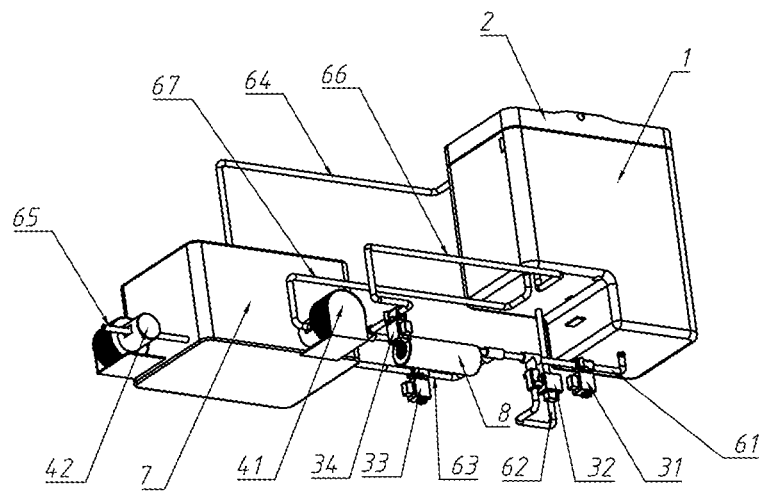
FIG. 1 is a structure diagram of the invention.
Figure 2:
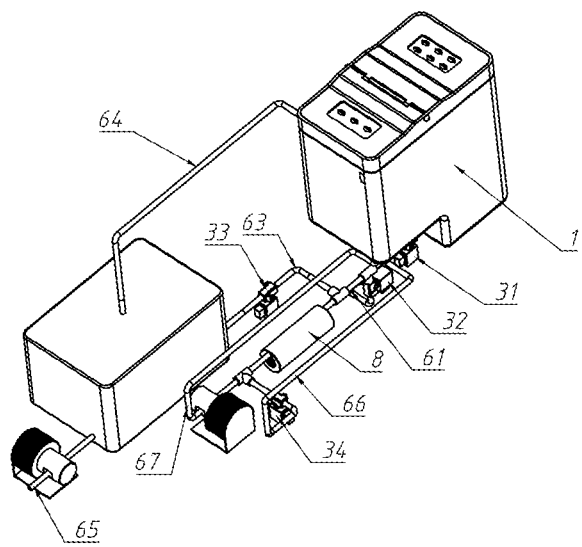
FIG. 2 is a structure diagram of the invention from another perspective.
Figure 3:
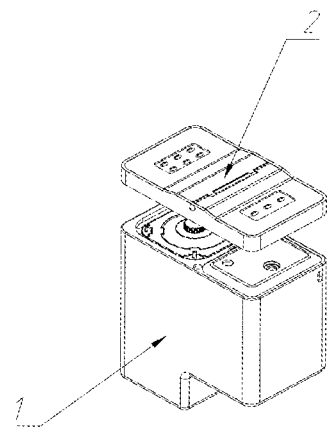
FIG. 3 is a schematic diagram of the connection relationship between the steamer body and the steamer outer cover.
Figure 4:
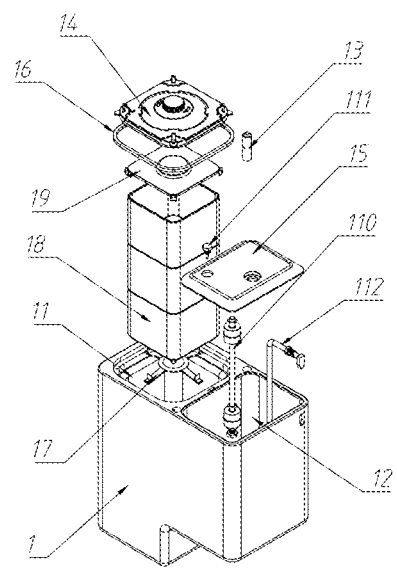
FIG. 4 is an exploded view of the steamer body.
Figure 5:
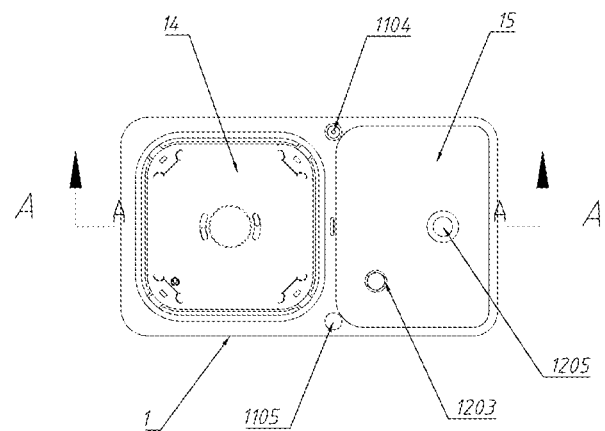
FIG. 5 is a top view of the steamer body.
Figure 6:
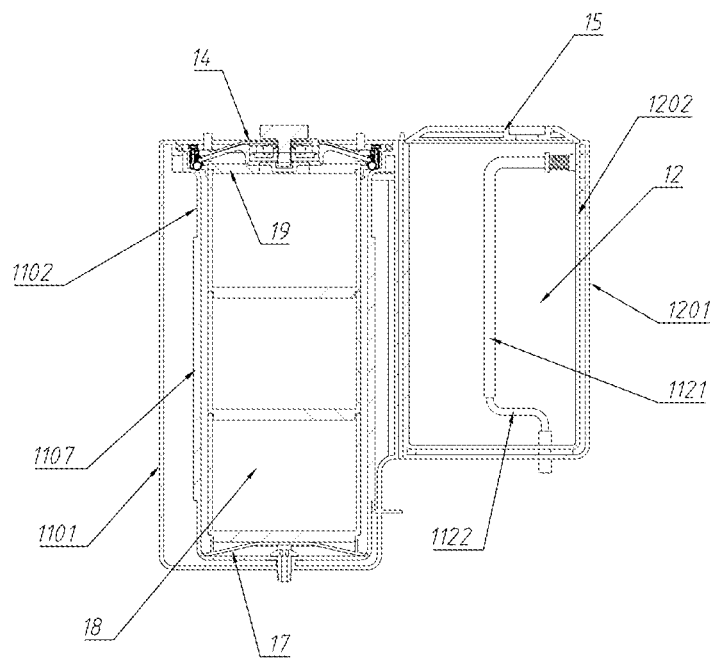
FIG. 6 is a section view A-A of FIG. 5.
Figure 7:
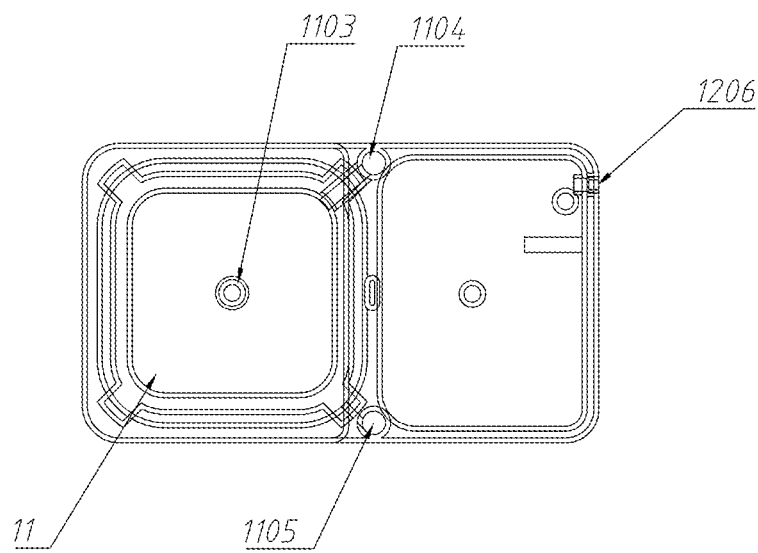
FIG. 7 is a top view of the steamer body with the steam pot cover and the water tank cover removed.
Figure 8:
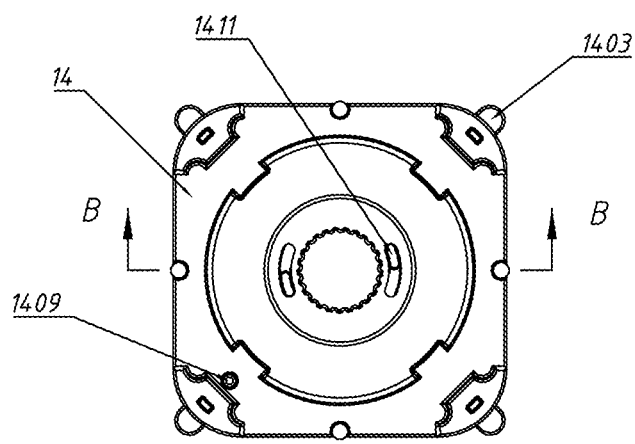
FIG. 8 is a structure diagram of the steam pot cover.
Figure 9:
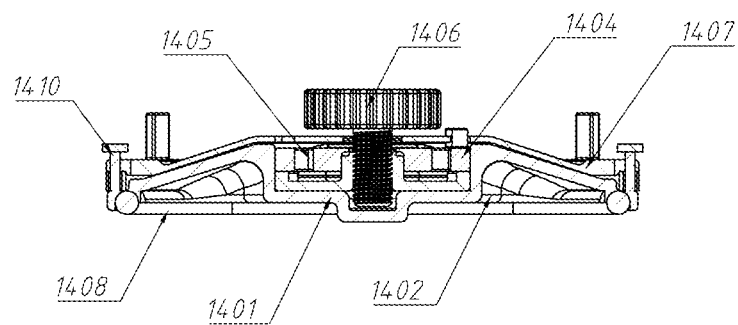
FIG. 9 is a section view B-B of FIG. 8.
Figure 10:
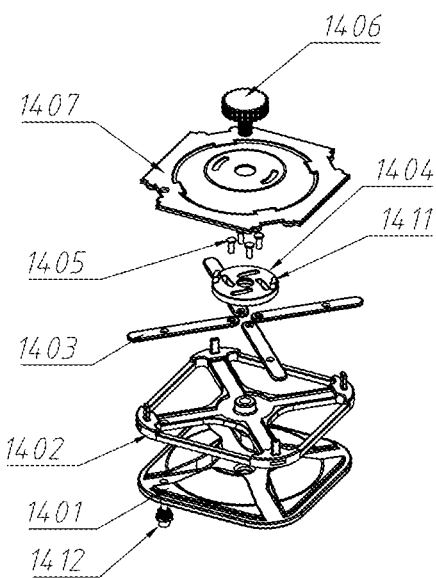
FIG. 10 is an exploded view of the steam pot cover.
Figure 11:
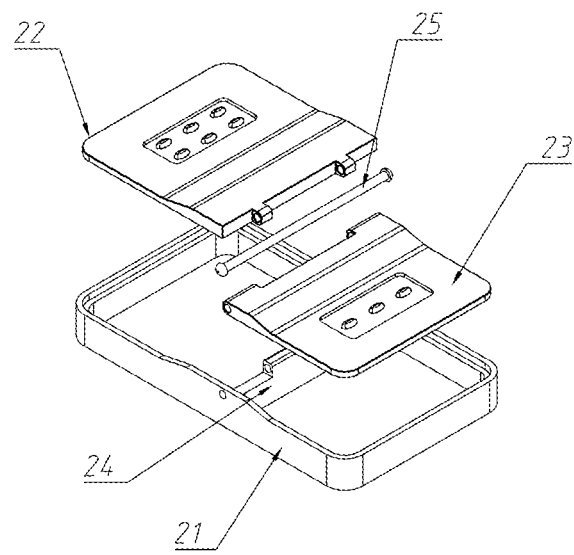
FIG. 11 is an exploded view of the steamer outer cover.
Figure 12:
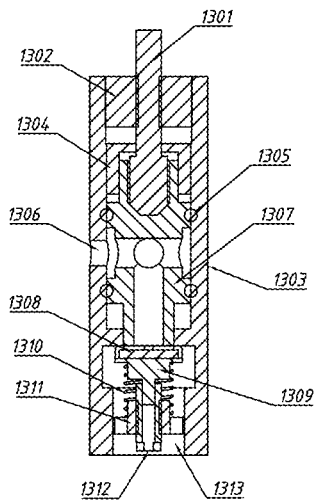
FIG. 12 is a structure diagram of the pressure regulating valve.
Figure 13:
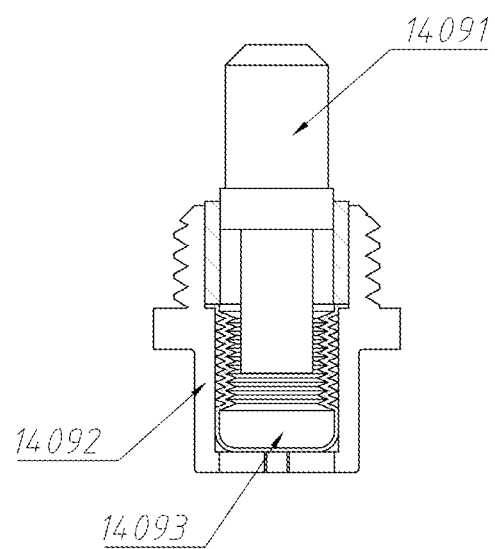
FIG. 13 is a structure diagram of the locking safety pin.

1—steamer body,
11—steam pot, 1101—steam pot body outer layer, 1102—steam pot body inner layer, 1103—steam pot inlet, 1104—steam exhaust port, 1105—remaining steam discharge outlet, 1107—steam pot cooling ring,
12—water tank, 1201—water tank outer layer, 1202—water tank inner layer, 1203—water tank inlet, 1205—water level gauge mounting hole, 1206—drinking water pipe hole,
13—pressure regulating valve, 1301—pressure regulating rod, 1302—valve seat gland, 1303—valve seat, 1304—pressure regulating rod gland, 1305—regulating valve sealing ring, 1306—steam inlet, 1307—pressure regulating valve element, 1308—steam exhaust sealing gasket, 1309—steam exhaust valve element, 1310—spring, 1311—pressure regulating seat, 1312—stroke regulating bolt, 1313—regulating valve steam exhaust port,
14—steam pot cover, 1401—pot cover body, 1402—pot cover locking body, 1403—locking rod, 1404—locking knob, 1405—locking sliding pin, 1406—regulating bolt, 1407—pot cover locking lid, 1408—sealing ring, 1410—sliding connecting pin, 1411—rotary operating rod, 1412—locking safety pin, 14091—movable pin, 14092—anti-release seat, 14093—silicon rubber expansion and sealing gasket,
15—water tank cover, 16—steam collection ring, 17—steam container elastic base, 18—steam container, 19—steam container cover, 110—water level gauge, 111—temperature measuring probe, 112—telescopic drinking water pipe, 1121—telescopic outer pipe, 1122—silicon rubber hose,
2—steamer outer cover, 21—steamer outer cover seat, 22—steam pot outer cover body, 23—water tank outer cover body, 24—partition plate, 25—rotating shaft,
31—the first solenoid valve, 32—the second solenoid valve, 33—the third solenoid valve, 34—the fourth solenoid valve,
41—the first water pump, 42—the second water pump,
5—extractor fan,
61—steam pot steam heating connecting pipe, 62—water tank steam heating connecting pipe, 63—car washing water tank heating connecting pipe, 64—car washing water tank remaining steam return pipe, 65—car washing nozzle connecting pipe, 66—drinking boiled water connecting pipe, 67—heating device water inlet connecting pipe
7—car washing water tank,
8—internal combination engine exhaust gas remaining heat extraction device.

DESCRIPTION OF EMBODIMENTS

An onboard multi-functional thermal-insulation and explosion-proof pressure steamer comprises a steamer body 1 and a steamer outer cover 2 covering the top of the steamer body 1, wherein a steam pot 11 is provided in the steamer body 1, multiple steam containers 18 with an open and hollow end are provided in the steam pot 11, the steam containers 18 are stacked from top to bottom orderly and sealed together, the steam container 18 on the top is covered with a steam container cover 19, and the steam container 18 at the bottom is connected with the steam pot 11 through a steam container elastic base 17;

the steam pot 11 is also covered with a steam pot cover 14; and a heating device is connected to the steam pot 11.

The steam pot 11 comprises a steam pot body outer layer 1101 and a steam pot body inner layer 1102. The steam pot body outer layer 1101 is sheathed on the exterior of the steam pot body inner layer 1102, the top of the steam pot body inner layer 1102 is connected with a broken bridge on the top of the steam pot body outer layer 1101, and an area between the steam pot body outer layer 1101 and the steam pot body inner layer 1102 is arranged for vacuum. A steam pot cooling ring 1107 is sheathed on the exterior of the steam pot body inner layer 1102, forming a closed cooling area between the steam pot body inner layer 1102 and the steam pot cooling ring 1107. The cooling area is connected with a refrigerator (model: TEC1-12710) via a steam pipe passing through the steam pot body outer layer 1101.

The steamer body 1 is also provided with a remaining steam discharge outlet 1105 and a steam exhaust port 1104, an extractor fan 5 is provided in the remaining steam discharge outlet 1105, which is connected with a steam collection ring 16 provided on the steam pot 11 and located above the steam pot cover 1. The steam collection ring 16 is hollow and annular, and fixedly provided on the top of the steam pot body inner layer 1102, and an opening of the steam collection ring 16 is provided on an annular surface of the steam collection ring 16 facing the center of the steam pot body inner layer 1102. The steam pot body inner layer 1102 is connected with the interior of the steam collection ring 16 through an opening of the steam collection ring 16, and the steam exhaust port 1104 provided on the steam collection ring 16 is connected with the remaining steam discharge outlet 1105;

the steam exhaust port 1104 is connected with a broken bridge in the steam pot 11 through an exhaust steam pipe, and a pressure regulating valve 13 is provided on the steam exhaust port 1104;

also comprising a steam pot inlet 1103, wherein the steam pot inlet 1103 is provided in the center at the bottom of the steam pot 11, and is connected with a broken bridge in the steam pot 11 by passing through the steam pot body outer layer 1101 and the steam pot body inner layer 1102.

The pressure regulating valve 13 comprises a hollow and columnar valve seat 1303 and a pressure regulating rod 1301. One end of the valve seat 1303 is connected with a valve seat gland 1302, and the other end thereof is connected with a pressure regulating seat 1311. The valve seat gland 1302 and pressure regulating seat 1311 are sealed and connected with an inner wall of the valve seat 1303, an internal thread through-hole is provided on the valve seat gland 1302, and one end of the pressure regulating rod 1301 is extended into the valve seat 1303 and is in threaded connection with the internal thread through-hole on the valve seat 1303;

a pressure regulating valve element 1307 is slidably provided in the valve seat 1303, a bump is provided on one end of the pressure regulating valve element 1307 facing the pressure regulating rod 1301, a blind hole is provided on the bump. A pressure regulating rod gland 1304 is sheathed on the bump, fixedly connected with the bump, and slidably connected with the valve seat 1303. One end of the pressure regulating rod 1301, which is extended into the valve seat 1303, passes through the through-hole on the pressure regulating rod gland 1304 and is movably provided in the blind hole. A limiting shaft shoulder is provided on the pressure regulating rod 1301, with a diameter greater than that of the through-hole on the pressure regulating rod gland 1304. The limiting shaft shoulder is located in the area enclosed by the pressure regulating rod gland 1304 and the pressure regulating valve element 1307;

two annular regulating valve sealing rings 1305 are provided and sheathed on the pressure regulating valve element 1307, and a steam inlet annular groove is provided on the pressure regulating valve element 1307 between the two annular regulating valve sealing rings 1305. The central axis of the steam inlet annular groove and the central axis of the valve element are on the same straight line. Multiple steam inlet channels are provided in the steam inlet annular groove and all the central axes of the steam inlet channels are in the same plane, perpendicular to the central axis of the valve element. A steam inlet 1306 is provided on the valve seat 1303 and connected with the steam inlet annular groove;

a steam flow channel is provided on one end of the pressure regulating valve element 1307 away from the pressure regulating rod 1301, and the steam flow channel is connected with the steam inlet channel;

a steam exhaust chamber is provided on one end of the valve seat 1303 away from the pressure regulating rod 1301, and a steam exhaust valve element 1309 and a spring 1310 are provided in the steam exhaust chamber; a steam exhaust sealing gasket 1308 is fixedly provided on the steam exhaust valve element 1309 and arranged against the steam flow channel, and the steam exhaust chamber is connected with the steam flow channel through the steam exhaust sealing gasket 1308;

a bolt hole is provided in the center of the pressure regulating seat 1311, a stroke regulating bolt 1312 passes through the bolt hole and is provided opposite to the steam exhaust valve element 1309, one end of the spring 1301 is arranged against the steam exhaust valve element 1309, and the other end thereof is arranged against the pressure regulating seat 1311; a regulating valve steam exhaust port 1313 is provided on one end of the valve seat 1303 connected with the pressure regulating seat 1311, and the regulating valve steam exhaust port 1313 is connected with the steam exhaust chamber through a steam exhaust channel on the pressure regulating seat 1311.

When the pressure regulating valve element 1307 and the steam exhaust sealing gasket 1308 are not in contact, the steam inlet 1306 is connected with the regulating valve steam exhaust port 1313 through the steam inlet channel, steam exhaust chamber and steam exhaust channel connected with each other, and the pressure regulating valve 13 is at the normal pressure.

Rotate the pressure regulating rod 1301, the pressure regulating rod 1301 is extended into the valve seat 1303 to squeeze the pressure regulating valve element 1307, so that the pressure regulating valve element 1307 is in contact with the steam exhaust sealing gasket 1308, the spring 1310 is compressed by means of the adjustment of the pressure regulating seat 1311, the steam exhaust valve element 1309 obtains the preset pressure of the spring 1310, the steam arrives at the steam exhaust sealing gasket 1308 through the steam inlet 1306 and is discharged from the regulating valve steam exhaust port 1313 by means of overcoming the pressure of the steam exhaust valve element 1309 obtained from the spring 1310, and the pressure regulating valve 13 is at a preset high pressure.

Continue to rotate the pressure regulating rod 1301, the pressure regulating rod 1301 will continue to be extended into the valve seat 1303, so that the steam exhaust valve element 1309 will be in close contact with the stroke regulating bolt 1312, the steam inlet 1306 and the regulating valve steam exhaust port 1313 are completely sealed and closed through the steam exhaust sealing gasket 1308, and the pressure in the steam pot 11 is sealed by the pressure regulating valve 13.

The steam container cover 19 comprises a steam container body and fasteners provided on four sides of the steam container body, fastener grooves are provided on four sides of an open end of the steam container 18, and the fasteners are matched with the fastener grooves.

The steam pot cover 14 comprises a pot cover body 1401, a pot cover locking body 1402 is connected to the pot cover body 1401, multiple chutes are provided on the pot cover locking body 1402, locking rods 1403 are slidably provided in the chutes, the locking rods 1403 are evenly arranged on the pot cover locking body 1402, and the locking rods 1403 are provided from the center of the pot cover locking body 1402 to the edge of the pot cover locking body 1402;

- the top of the steam pot 11 is provided with clamping grooves with the same number as the locking rods 1403, the clamping grooves are located in the same horizontal plane, and the locking rods 1403 are matched and connected with the clamping grooves;
- one end of the locking rod 1403 is extended out from the pot cover locking body 1402 and is clamped in the clamping groove, the other end thereof is connected with a driving device, and the driving device drives the locking rods 1403 to extend or retract synchronously.

The driving device comprises a locking knob 1404, driving grooves with the same number as the chutes are provided on the locking knob 1404, one end of the locking rod 1403 close to the center of the pot cover locking body 1402 is connected with the driving groove through a locking sliding pin 1405, the locking sliding pin 1405 is rotatably connected with the locking rod 1403 and slidably provided in the driving groove, and the central axes of the locking sliding pin 1405 are vertical to the plane of the pot cover locking body 1402;

- the driving groove is provided from the center to the edge of the locking knob 1404, the locking knob 1404 is rotated, and the locking sliding pin 1405 slides in the driving groove to drive the locking rods 1403 to extend or retract.

The onboard multi-functional thermal-insulation and explosion-proof pressure steamer also comprises a pot cover locking lid 1407, wherein the pot cover locking lid 1407 is connected with the pot cover locking body 1402 through a regulating bolt 1406 provided at the center of the pot cover locking lid 1407, and the rotating central line of the locking knob 1404 and the rotating central line of the regulating bolt 1406 are on the same straight line;

- the regulating bolt 1406 is in threaded connection with the pot cover locking body 1402 after passing through the pot cover locking lid 1407 and the locking knob 1404 in turn, the pot cover body 1401 is slidably connected with the pot cover locking body 1402 through multiple sliding connecting pins 1410, a limiting bump is respectively provided on both ends of the sliding connecting pin 1410, and the pot cover body 1401 and the pot cover locking body 1402 are located between two limiting bumps on the same sliding connecting pin 1410;
- a blind hole is provided at the center of the pot cover body 1401, one end of the regulating bolt 1406 passing through the pot cover locking body 1402 is opposite to the blind hole; when the regulating bolt 1406 is extended out towards the pot cover body 1401, the regulating bolt 1406 is arranged against the blind hole;
- the pot cover locking lid 1407, the locking knob 1404 and the pot cover locking body 1402 are sheathed on the regulating bolt 1406;
- a rotary operating rod 1411 is provided on the locking knob 1404, an arc rotary operating groove is provided on the position of the pot cover locking lid 1407 corresponding to the rotary operating rod 1411, one end of the rotary operating rod 1411 is fixedly connected with the locking knob 1404, and the other end thereof is provided towards the pot cover locking lid 1407 and is extended out from the rotary operating groove; the rotary operating rod 1411 slides along the rotary operating groove to drive the locking knob 1404 to rotate.

Guide holes with the same number as the chutes are fixedly provided at the edge of the pot cover locking body 1402, and one end of the locking rod 1403 away from the center of the pot cover locking body 1402 is slidably provided in the guide hole.

The onboard multi-functional thermal-insulation and explosion-proof pressure steamer also comprises a locking safety pin 1412, wherein the locking safety pin 1412 comprises a movable pin 14091 and an anti-release seat 14092. One end of the movable pin 14091 is connected with a silicon rubber expansion and sealing gasket 14093, the anti-release seat 14092 is fixedly connected with the pot cover body 1401, the silicon rubber expansion and sealing gasket 14093 is provided in the area enclosed by the anti-release seat 14092 and the pot cover body 1401, and this area is connected with the interior of the steam pot 11; the other end of the movable pin 14091 is vertically extended out towards the pot cover locking body 1402. A through-hole is provided on the pot cover locking body 1402 and located in a chute, a safety hole is provided on the locking rod 1403 in this chute, and the movable pin 14091 is matched with the safety hole. When the steam pressure in the steam pot 11 rises, the movable pin 14091 is squeezed by the silicon rubber expansion and sealing gasket 14093 and extended out towards the locking rod 1403; when the steam pressure in the steam pot 11 drops, the silicon rubber expansion and sealing gasket 14093 is reset, and the movable pin 14091 is retracted.

The annular sealing ring (1408) is provided between the pot cover body 1401 and the steam pot 11.

A water tank 12 with an open and hollow upper end is also provided in the steamer body 1, a water tank cover 15 is provided on the open end of the water tank 12, and both the water tank 12 and the steam pot 11 are located in the area enclosed by the steamer body 1 and the steamer outer cover 2;

- a water level gauge mounting hole 1205, a temperature measuring probe hole, a drinking water pipe hole 1206 and a water filling nozzle are provided on the water tank cover 15, a water level gauge 111 is mounted in the water level gauge mounting hole 1205, and a temperature measuring probe 110 is mounted in the temperature measuring probe hole;
- a telescopic drinking water pipe 112 is provided in the drinking water pipe hole 1206, and the telescopic drinking water pipe 112 comprises a telescopic outer pipe 1121 and a silicon rubber hose 1122, wherein the telescopic outer pipe 1121 is sheathed on the exterior of the silicon rubber hose 1122, with one end extended out of the water tank 12 as a water outlet end and the other end thereof located in the water tank 12 as a water inlet end. A limiting bump is provided on the telescopic outer pipe 1121, the limiting bump is arranged against the water tank 12 through a telescopic spring 1310, and the limiting bump is provided in the water tank 12. One end of the silicon rubber hose 1122 is connected with a water outlet end of the telescopic outer pipe 1121, and the other end thereof is connected with the interior of the water tank 12 through a first water pump 41;

the water tank 12 is also connected with the heating device.

The water tank 12 comprises a water tank outer layer 1201 and a water tank inner layer 1202, the water tank outer layer 1201 is sheathed on the exterior of the water tank inner layer 1202, and the top of the water tank inner layer 1202 is sealed and connected with that of the water tank outer layer 1201;

the area enclosed by the water tank inner layer 1202 and the water tank outer layer 1201 is a vacuum area.

A water tank inlet 1203 is provided on the bottom of the water tank 12, the water tank inlet 1203 is connected with the interior of the water tank 12, and the water tank inlet 1203 is connected with the heating device.

A temperature measuring hole is also provided on the water tank cover 15, a temperature measuring probe 111 is provided in the temperature measuring hole, and one end of the temperature measuring probe 111 is extended into the water tank 12.

The steamer outer cover 2 comprises an annular steamer outer cover seat 21, a steam pot outer cover body 22 covering the steamer outer cover seat 21, and a water tank outer cover body 23;

the steamer outer cover seat 21 is in matched connection with the steamer body 1, a partition plate 24 is provided in the steamer outer cover seat 21, the area in the steamer outer cover seat 21 is divided into an area of the steam pot 11 and an area of the water tank 12 by means of the partition plate 24; the area of the steam pot 11 is covered with the steam pot outer cover body 22, and the area of the water tank 12 is covered with the water tank outer cover body 23;

a bump is provided on the partition plate 24, a rotating shaft 25 is rotatably connected to the bump, and both the water tank outer cover body 23 and the steam pot outer cover body 22 are rotatably connected with the rotating shaft 25;

two ends of the rotating shaft 25 are rotatably connected with two corresponding sidewalls of the steamer outer cover seat 21, respectively; and two ends of the partition plate 24 are also fixedly connected with two corresponding sidewalls of the steamer outer cover seat 21, respectively.

Preferably, the onboard multi-functional thermal-insulation and explosion-proof pressure steamer also comprises a car washing water tank 7, a car washing nozzle connecting pipe 65 is connected to the car washing water tank 7, and a second water pump 42 is provided on the car washing nozzle connecting pipe 65;

a bendable heat exchange tube is provided in the car washing water tank 7, and the heat exchange tube is connected with the heating device.

One end of the heating device is connected with the water tank 12 through a heating device water inlet connecting pipe 67, the other end thereof is connected with the steam pot inlet 1103 through a steam pot steam heating connecting pipe 61, and a first solenoid valve 31 is provided on the steam pot steam heating connecting pipe 61;

a water tank steam heating connecting pipe 62 is connected to the steam pot steam heating connecting pipe 61 through a tee, and one end of the water tank steam heating connecting pipe 62 away from the steam pot steam heating connecting pipe 61 is connected with the water tank inlet 1203;

a steam heating outlet is provided on the top of the water tank 12, the steam heating outlet is connected with one end of the heat exchange tube through a car washing water tank remaining steam return pipe 64, the other end of the heat exchange tube is connected with the steam pot steam heating connecting pipe 61 through a car washing water tank heating connecting pipe 63, and a third solenoid valve 33 is provided on the car washing water tank heating connecting pipe 63;

the first water pump 41 is provided on a water inlet connecting pipe of the internal combination engine exhaust gas remaining heat extraction device 8;

the first water pump 41 is provided on the heating device water inlet connecting pipe 67;

also comprising a drinking boiled water connecting pipe 66, one end of the drinking boiled water connecting pipe 66 is connected with the heating device water inlet connecting pipe 67 between the first water pump 41 and the heating device, the other end thereof is extended into the water tank 12 and is connected with one end of the silicon rubber hose 1122 away from the water outlet end of the telescopic outer pipe 1121, and a fourth solenoid valve 34 is provided on the drinking boiled water connecting pipe 66.

The heating device is an internal combination engine exhaust gas remaining heat extraction device 8 that is connected with an internal combination engine exhaust device.

The internal combination engine exhaust gas remaining heat extraction device 8 comprises multiple branch pipes, a flange plate is provided between the internal combination engine and the internal combination engine exhaust device, one end of each of the branch pipes is connected with a gas combination pipe, and the other end thereof is connected with the flange plate; a heat conversion device is provided in each branch pipe, a one-way flow heating channel and a high-temperature exhaust gas channel closed to each other are provided in the heat conversion device, and heating channels in the branch pipes are connected successively to form a water vapor channel;

one end of the water vapor channel is connected with the water tank 12 through the heating device water inlet connecting pipe 67, and the other end thereof is connected with the steam pot steam heating connecting pipe 61.

The heat conversion device is characterized into that a one-way flow heating channel and a high-temperature exhaust gas channel independent from each other are provided in a double-deck chamber, the surface of the high-temperature exhaust gas channel has a fin-like structure, and the water vapor channel has a return-type structure. Or, the heat conversion device has a wedge heat exchange structure, the high-temperature exhaust gas channel surface has an annular fin-like structure, and the water vapor channel is provided at the tube pass, and the high-temperature exhaust gas channel is provided at the center and the shell pass.

The tube pass shape of the water vapor channel has a sinusoidal wave surrounding structure.

The heat conversion device is a cylindrical tubular heat conversion device, and two ends thereof have a tapered structure, the water vapor channel is provided between the heat conversion device heating outer layer and the heat conversion device heating inner layer, the water vapor channel is a rectangular water vapor channel, the surfaces of the heat conversion device heating outer layer and the heat conversion device heating inner layer have a fin-like structure, the tube pass of the water vapor channel has an S-curve surrounding shape, the water vapor channel is provided at the tube pass, and the high-temperature exhaust gas channel is provided at an inner exhaust gas flow chamber and an outer exhaust gas flow chamber in the heat conversion device.

The heat conversion device is rectangular, the water vapor channel is provided in the heat conversion device, a plate fin-like heating outer layer of the heat conversion device is provided on the upper and lower parts of the water vapor channel respectively, the tube pass of the water vapor channel has a plate return-type shape, the water vapor channel is provided at the tube pass, and the high-temperature exhaust gas channel is provided at the outer exhaust gas flow chamber between the heat conversion device heating outer layer and the branch pipe.

Or, the heating device is an electric heating steam generator, the electric heating steam generator comprises a steam shell and an electric heating pipe provided in the steam shell, a water inlet and a steam outlet are provided on the steam shell, the steam outlet is connected with the steam pot steam heating connecting pipe 61, and the water inlet is connected with the heating device water inlet connecting pipe 67. An onboard multi-functional thermal-insulation and explosion-proof pressure steamer can be placed in the kitchen or other places with power supply for use, when the heating device is the electric heating steam generator. An onboard multi-functional thermal-insulation and explosion-proof pressure steamer can be placed on the vehicle for use if the heating device is the internal combustion engine exhaust gas remaining heat extraction device (8).

Using method of the steam pot 11: put the food material into the steam container (18), seal it well, and put it on the steam container elastic base 17; cover it with the steam pot cover 14, rotate the rotary operating rod 1411 on the locking knob 1404, extend the locking rod 1403 and insert it into the clamping groove of the steamer body, turn the regulating bolt 1406, move the pot cover locking body 1402 upwards, and the locking rod 1403 and the clamping groove are locked; continue to turn the regulating bolt 1406, extend the regulating bolt 1406 towards the pot cover body 1401 and against the blind hole on the pot cover body 1401, move the pot cover body 1401 downwards, seal the steam container 18 in the steam pot 11 through the annular sealing ring 1408, compress the steam container 18 with the pot cover body 1401 through the elastic base, and the pressure regulating valve 13 is set in a preset high-pressure state. Open the first water pump 41 and the first solenoid valve 31, close the second water pump 42, the second solenoid valve 32, the third solenoid valve 33 and the fourth solenoid valve 34, and the high-temperature steam generated by the internal combination engine exhaust gas remaining heat extraction device 8 enters into the steam pot 11 of the steamer body through the steam pot inlet 1103. With the continuous flow of steam, the pressure in the steam pot 11 rises, the movable pin 14091 in the locking safety pin 1412 is moved upwards and inserted into the safety hole on the locking rod 1403, so as to avoid that the steam pot cover 14 is opened when there is pressure in the steam pot 11, and that the pressure in the steam pot 11 exceeds the preset pressure of the pressure regulating valve 13. The high-temperature and high-pressure steam is discharged through the regulating valve steam exhaust port 1313 of the pressure regulating valve 13 to realize the functions of steaming, boiling and stewing the food material in the steam container 18.

Preservation of the food material: after the steam pot 11's functions of steaming, boiling and stewing the food material in the steam container 18 are completed, the remaining steam and condensed water in the steam pot 11 will be discharged through the steam pot inlet 1103, the pressure regulating rod 1301 of the pressure regulating valve 13 is rotated, so that the steam exhaust valve element 1309 is in close contact with the stroke regulating bolt 1312, at this moment, the pressure in the steam pot 11 is sealed by the pressure regulating valve 13, the steam pot cooling ring 1107 is turned on to cool the steam pot 11, the temperature of the steam container 18 drops rapidly, and the pressure in the steam pot 11 drops as well. As a certain vacuum is formed in the steam pot 11 due to the sealing of the silicon rubber expansion and sealing gasket 14093 of the locking safety pin 1412 and the sealing of the pressure regulating valve 13, the negative pressure in the steam pot 11 is sealed by the annular sealing ring 1408, and a certain vacuum in the steam pot 11 can keep the cooked food material fresh, improve the taste of the food material, and can store the cooked food material for a long time.

Open the first water pump 41 and the second solenoid valve 32, close the second water pump 42, the first solenoid valve 31, the third solenoid valve 33 and the fourth solenoid valve 34, the high-temperature steam generated by the internal combustion engine exhaust gas remaining heat extraction device 8 enters into the water tank 12 through the water tank inlet 1203 on the steamer body to heat the steam of the water in the water tank 12, and close the first water pump 41 and the second solenoid valve 32 when the water temperature reaches the preset temperature. When drinking water, open the first pump 41 and the fourth solenoid valve 34, close the first solenoid valve 31, the second solenoid valve 32, the third solenoid valve 33 and the second water pump 42, the boiled water is injected into the water cup through the telescopic water pipe 112, for the driver and passengers to drink.

Open the first water pump 41 and the third solenoid valve 33, close the second water pump 42, the first solenoid valve 31, the second solenoid valve 32 and the fourth solenoid valve 34, the high-temperature steam generated by the internal combustion engine exhaust gas remaining heat extraction device 8 enters into the heat exchange pipe in the car washing water tank 7 through the car washing water tank heating connecting pipe 63 to circularly heat the water in the car washing water tank 7, and the remaining steam from the heat exchange pipe flows back into the water tank 12 through the car washing water tank remaining steam return pipe 64. Close the first water pump 41 and the third solenoid valve 33 when the water temperature of the car washing water tank 7 reaches the set value, and open the second water pump 42 to wash the car with hot water.

What is claimed is:

1. An onboard multi-functional thermal-insulation and explosion-proof pressure steamer, comprising a steamer body (1) and a steamer outer cover (2) covering the top of the steamer body (1), wherein a steam pot (11) is provided in the steamer body (1); multiple steam containers (18) with an open and hollow end are installed inside of the steam pot (11), and the steam containers (18) are stacked from top to bottom orderly and sealed together; the top of steam container (18) is covered with a steam container cover (19), and the bottom of the steam container (18) is connected with the steam pot (11) through a steam container elastic base (17);

the steam pot (11) is covered with a steam pot cover (14); and a heating device is connected to the steam pot (11);

wherein the steamer body (1) is also provided with a remaining steam discharge outlet (1105) and a steam exhaust port (1104); an extractor fan (5) is provided in the remaining steam discharge outlet (1105), which is connected with a steam collection ring (16) provided on the steam pot (11) and located above the steam pot cover (14); the steam collection ring (16) is hollow and annular, and fixedly provided on the top of the steam pot body inner layer (1102), and an opening of the steam collection ring (16) is provided on an annular surface of the steam collection ring (16) facing the center of the steam pot body inner layer (1102); the steam pot body inner layer (1102) is connected with the interior of the steam collection ring (16) through an opening of the steam collection ring (16), and the steam exhaust port (1104) provided on the steam collection ring (16) is connected with the remaining steam discharge outlet (1105);

the steam exhaust port (1104) is connected with a broken bridge in the steam pot (11) through an exhaust steam pipe, and a pressure regulating valve (13) is provided on the steam exhaust port (1104); wherein the pressure regulating valve (13) comprises a hollow and columnar valve seat (1303) and a pressure regulating rod (1301); one end of the valve seat (1303) is connected with a valve seat gland (1302), and the other end thereof is connected with a pressure regulating seat (1311); the valve seat gland (1302) and the pressure regulating seat (1311) are sealed and connected with an inner wall of the valve seat (1303), an internal thread through-hole is provided on the valve seat gland (1302), and one end of the pressure regulating rod (1301) is extended into the valve seat (1303) and is in threaded connection with the internal thread through-hole on the valve seat (1303);

a pressure regulating valve element (1307) is slidably provided in the valve seat (1303), a bump is provided on one end of the pressure regulating valve element (1307) facing the pressure regulating rod (1301), and a blind hole is provided on the bump; a pressure regulating rod gland (1304) is sheathed on the bump, fixedly connected with the bump, and slidably connected with the valve seat (1303); one end of the pressure regulating rod (1301), which is extended into the valve seat (1303), passes through the through-hole on the pressure regulating rod gland (1304) and is movably provided in the blind hole; a limiting shaft shoulder is provided on the pressure regulating rod (1301), with a diameter greater than that of the through-hole on the pressure regulating rod gland (1304); the limiting shaft shoulder is located in the area enclosed by the pressure regulating rod gland (1304) and the pressure regulating valve element (1307);

two annular regulating valve sealing rings (1305) are provided and sheathed on the pressure regulating valve element (1307), and a steam inlet annular groove is provided on the pressure regulating valve element (1307) between the two annular regulating valve sealing rings (1305); the central axis of the steam inlet annular groove and the central axis of the valve element are on the same straight line; multiple steam inlet channels are installed inside of the steam inlet annular groove and all the central axes of the steam inlet channels are in the same plane, perpendicular to the central axis of the valve element; a steam inlet (1306) is provided on the valve seat (1303) and connected with the steam inlet annular groove;

a steam flow channel is provided on one end of the pressure regulating valve element 1307) away from the pressure regulating rod (1301), and the steam flow channel is connected with the steam inlet channel;

a steam exhaust chamber is provided on one end of the valve seat (1303) away from the pressure regulating rod (1301), and a steam exhaust valve element (1309) and a spring (1310) are provided in the steam exhaust chamber; a steam exhaust sealing gasket (1308) is fixedly provided on the steam exhaust valve element (1309) and arranged against the steam flow channel, and the steam exhaust chamber is connected with the steam flow channel through the steam exhaust sealing gasket (1308);

a bolt hole is provided in the center of the pressure regulating seat (1311), a stroke regulating bolt (1312) passes through the bolt hole and is provided opposite to the steam exhaust valve element (1309), one end of the spring (1301) is arranged against the steam exhaust valve element (1309), and the other end thereof is arranged against the pressure regulating seat (1311); a regulating valve steam exhaust port (1313) is provided on one end of the valve seat (1303) connected with the pressure regulating seat (1311), and the regulating valve steam exhaust port (1313) is connected with the steam exhaust chamber through a steam exhaust channel on the pressure regulating seat (1311);

a steam pot inlet (1103) is installed in the center at the bottom of the steam pot (11) and connected with a broken bridge in the steam pot (11) by passing through the steam pot body outer layer (1101) and the steam pot body inner layer (1102).

2. The onboard multi-functional thermal-insulation and explosion-proof pressure steamer according to claim 1, wherein the steam pot (11) comprises a steam pot body outer layer (1101) and a steam pot body inner layer (1102); the steam pot body outer layer (1101) is sheathed on the exterior of the steam pot body inner layer (1102), the top of the steam pot body inner layer (1102) is connected with a broken bridge on the top of the steam pot body outer layer (1101), and an area between the steam pot body outer layer (1101) and the steam pot body inner layer (1102) is arranged for vacuum; a steam pot cooling ring (1107) is sheathed on the exterior of the steam pot body inner layer (1102), forming a closed cooling area between the steam pot body inner layer (1102) and the steam pot cooling ring (1107); the cooling area is connected with a refrigerator via a steam pipe passing through the steam pot body outer layer (1101).

3. The onboard multi-functional thermal-insulation and explosion-proof pressure steamer according to claim 1, wherein the steam container cover (19) comprises a steam container body and fasteners provided on four sides of the steam container body, fastener grooves are provided on four sides of an open end of the steam container (18), and the fasteners are matched with the fastener grooves.

4. The onboard multi-functional thermal-insulation and explosion-proof pressure steamer according to claim 1, wherein the steam pot cover (14) comprises a pot cover body (1401), a pot cover locking body (1402) is connected to the pot cover body (1401), multiple chutes are provided on the pot cover locking body (1402), locking rods (1403) are slidably provided in the chutes, the locking rods (1403) are evenly arranged on the pot cover locking body (1402), and the locking rods (1403) are provided from the center of the pot cover locking body (1402) to the edge of the pot cover locking body (1402);

the top of the steam pot (11) is provided with clamping grooves with the same number as the locking rods (1403), the clamping grooves are located in the same horizontal plane, and the locking rods (1403) are matched and connected with the clamping grooves;

one end of the locking rod (1403) is extended out from the pot cover locking body (1402) and is clamped in the clamping groove, the other end thereof is connected with a driving device, and the driving device drives the locking rods (1403) to extend or retract synchronously.

5. The onboard multi-functional thermal-insulation and explosion-proof pressure steamer according to claim 4, wherein the driving device comprises a locking knob (1404), driving grooves with the same number as the chutes are provided on the locking knob (1404), one end of the locking rod (1403) close to the center of the pot cover locking body (1402) is connected with the driving groove through a locking sliding pin (1405), the locking sliding pin (1405) is rotatably connected with the locking rod (1403) and slidably provided in the driving groove, and the central axes of the locking sliding pin (1405) are vertical to the plane of the pot cover locking body (1402);

the driving groove is provided from the center to the edge of the locking knob (1404), the locking knob (1404) is rotated, and the locking sliding pin (1405) slides in the driving groove to drive the locking rods (1403) to extend or retract.

6. The onboard multi-functional thermal-insulation and explosion-proof pressure steamer according to claim 5, wherein the onboard multi-functional thermal-insulation and explosion-proof pressure steamer further comprising a pot cover locking lid (1407), wherein the pot cover locking lid (1407) is connected with the pot cover locking body (1402) through a regulating bolt (1406) provided at the center of the pot cover locking lid (1407), and the rotating central line of the locking knob (1404) and the rotating central line of the regulating bolt (1406) are on the same straight line;

the regulating bolt (1406) is in threaded connection with the pot cover locking body (1402) after passing through the pot cover locking lid (1407) and the locking knob (1404) in turn, the pot cover body (1401) is slidably connected with the pot cover locking body (1402) through multiple sliding connecting pins (1410), a limiting bump is respectively provided on both ends of the sliding connecting pin (1410), and the pot cover body (1401) and the pot cover locking body (1402) are located between two limiting bumps on the same sliding connecting pin (1410);

a blind hole is provided at the center of the pot cover body (1401), one end of the regulating bolt (1406) passing through the pot cover locking body (1402) is opposite to the blind hole; when the regulating bolt (1406) is extended out towards the pot cover body (1401), the regulating bolt (1406) is arranged against the blind hole;

the pot cover locking lid (1407), the locking knob (1404) and the pot cover locking body (1402) are sheathed on the regulating bolt (1406);

a rotary operating rod (1411) is provided on the locking knob (1404), an arc rotary operating groove is provided on the position of the pot cover locking lid (1407) corresponding to the rotary operating rod (1411), one end of the rotary operating rod (1411) is fixedly connected with the locking knob (1404), and the other end thereof is provided towards the pot cover locking lid (1407) and is extended out from the rotary operating groove; the rotary operating rod (1411) slides along the rotary operating groove to drive the locking knob (1404) to rotate.

7. The onboard multi-functional thermal-insulation and explosion-proof pressure steamer according to claim 6, wherein guide holes with the same number as the chutes are fixedly provided at the edge of the pot cover locking body (1402), and one end of the locking rod (1403) away from the center of the pot cover locking body (1402) is slidably provided in the guide hole.

8. The onboard multi-functional thermal-insulation and explosion-proof pressure steamer according to claim 7, wherein the onboard multi-functional thermal-insulation and explosion-proof pressure steamer further comprises a locking safety pin (1412), wherein the locking safety pin (1412) comprises a movable pin (14091) and an anti-release seat (14092); one end of the movable pin (14091) is connected with a silicon rubber expansion and sealing gasket (14093), the anti-release seat (14092) is fixedly connected with the pot cover body (1401), the silicon rubber expansion and sealing gasket (14093) is provided in the area enclosed by the anti-release seat (14092) and the pot cover body (1401), and this area is connected with the interior of the steam pot (11); the other end of the movable pin (14091) is vertically extended out towards the pot cover locking body (1402); a through-hole is provided on the pot cover locking body (1402) and located in a chute, a safety hole is provided on the locking rod (1403) in this chute, and the movable pin (14091) is matched with the safety hole, when the steam pressure in the steam pot (11) rises, the movable pin (14091) is squeezed by the silicon rubber expansion and sealing gasket (14093) and extended out towards the locking rod (1403); when the steam pressure in the steam pot (11) drops, the silicon rubber expansion and sealing gasket (14093) is reset, and the movable pin (14091) is retracted.

9. The onboard multi-functional thermal-insulation and explosion-proof pressure steamer according to claim 8, wherein an annular sealing ring (1408) is provided between the pot cover body (1401) and the steam pot (11).

10. The onboard multi-functional thermal-insulation and explosion-proof pressure steamer according to claim 1, wherein a water tank (12) with an open and hollow upper end is also provided in the steamer body (1), a water tank cover (15) is provided on the open end of the water tank (12), and both the water tank (12) and the steam pot (11) are located in the area enclosed by the steamer body (1) and the steamer outer cover (2);

a water level gauge mounting hole (1205), a temperature measuring probe hole, a drinking water pipe hole (1206) and a water filling nozzle are provided on the water tank cover (15), a water level gauge (110) is mounted in the water level gauge mounting hole (1205), and a temperature measuring probe (111) is mounted in the temperature measuring probe hole;

a telescopic drinking water pipe (112) is provided in the drinking water pipe hole (1206), and the telescopic drinking water pipe (112) comprises a telescopic outer pipe (1121) and a silicon rubber hose (1122), wherein the telescopic outer pipe (1121) is sheathed on the exterior of the silicon rubber hose (1122) with one end extended out of the water tank (12) as a water outlet end and the other end thereof located in the water tank (12) as a water inlet end; a limiting bump is provided on the telescopic outer pipe (1121) and arranged against the water tank (12) through the telescopic spring (1310), and the limiting bump is provided in the water tank (12), one end of the silicon rubber hose (1122) is connected with a water outlet end of the telescopic outer pipe (1121), and the other end thereof is connected with the interior of the water tank (12) through a first water pump (41);

the water tank (12) is also connected with the heating device.

11. The onboard multi-functional thermal-insulation and explosion-proof pressure steamer according to claim 10, wherein the water tank (12) comprises a water tank outer layer (1201) and a water tank inner layer (1202), the water tank outer layer (1201) is sheathed on the exterior of the water tank inner layer (1202), and the top of the water tank inner layer (1202) is sealed and connected with that of the water tank outer layer (1201);

the area enclosed by the water tank inner layer (1202) and the water tank outer layer (1201) is a vacuum area.

12. The onboard multi-functional thermal-insulation and explosion-proof pressure steamer according to claim 11, wherein a water tank inlet (1203) is provided on the bottom of the water tank (12), the water tank inlet (1203) is connected with the interior of the water tank (12), and the water tank inlet (1203) is connected with the heating device.

13. The onboard multi-functional thermal-insulation and explosion-proof pressure steamer according to claim 12, wherein a temperature measuring hole is also provided on the water tank cover (15), a temperature measuring probe (111) is provided in the temperature measuring hole, and one end of the temperature measuring probe (111) is extended into the water tank (12).

14. The onboard multi-functional thermal-insulation and explosion-proof pressure steamer according to claim 1, wherein the steamer outer cover (2) comprises an annular steamer outer cover seat (21), a steam pot outer cover body (22) covering the steamer outer cover seat (21), and a water tank outer cover body (23);

the steamer outer cover seat (21) is in matched connection with the steamer body (1), a partition plate (24) is provided in the steamer outer cover seat (21), the area in the steamer outer cover seat (21) is divided into an area of the steam pot (11) and an area of the water tank (12) by means of the partition plate (24); the area of the steam pot (11) is covered with the steam pot outer cover body (22), and the area of the water tank (12) is covered with the water tank outer cover body (23);

a bump is provided on the partition plate (24), a rotating shaft (25) is rotatably connected to the bump, and both the water tank outer cover body (23) and the steam pot outer cover body (22) are rotatably connected with the rotating shaft (25);

two ends of the rotating shaft (25) are rotatably connected with two corresponding sidewalls of the steamer outer cover seat (21), respectively; and two ends of the partition plate (24) are also fixedly connected with two corresponding sidewalls of the steamer outer cover seat (21), respectively.

15. The onboard multi-functional thermal-insulation and explosion-proof pressure steamer according to claim 10, also comprising a car washing water tank (7), a car washing nozzle connecting pipe (65) is connected to the car washing water tank (7), and a second water pump (42) is provided on the car washing nozzle connecting pipe (65);

a bendable heat exchange tube is provided in the car washing water tank (7), and the heat exchange tube is connected with the heating device.

16. The onboard multi-functional thermal-insulation and explosion-proof pressure steamer according to claim 15, wherein one end of the heating device is connected with the water tank (12) through a heating device water inlet connecting pipe (67), the other end thereof is connected with the steam pot inlet (1103) through a steam pot steam heating connecting pipe (61), and a first solenoid valve (31) is provided on the steam pot steam heating connecting pipe (61);

a water tank steam heating connecting pipe (62) is connected to the steam pot steam heating connecting pipe (61) through a tee, and one end of the water tank steam heating connecting pipe (62) away from the steam pot steam heating connecting pipe (61) is connected with the water tank inlet (1203);

a steam heating outlet is provided on the top of the water tank (12), the steam heating outlet is connected with one end of the heat exchange tube through a car washing water tank remaining steam return pipe (64), the other end of the heat exchange tube is connected with the steam pot steam heating connecting pipe (61) through a car washing water tank heating connecting pipe (63), and a third solenoid valve (33) is provided on the car washing water tank heating connecting pipe (63);

the first water pump (41) is provided on the heating device water inlet connecting pipe (67);

also comprising a drinking boiled water connecting pipe (66), one end of the drinking boiled water connecting pipe (66) is connected with the heating device water inlet connecting pipe (67) between the first water pump (41) and the heating device, the other end thereof is extended into the water tank (12) and is connected with one end of the silicon rubber hose (1122) away from the water outlet end of a telescopic outer pipe (1121), and a fourth solenoid valve (34) is provided on the drinking boiled water connecting pipe (66).

17. The onboard multi-functional thermal-insulation and explosion-proof pressure steamer according to claim 16, wherein the heating device is an internal combustion engine exhaust gas remaining heat extraction device (8) that is connected with an internal combustion engine exhaust device.

18. The onboard multi-functional thermal-insulation and explosion-proof pressure steamer according to claim 17, wherein the internal combustion engine exhaust gas remaining heat extraction device (8) comprises multiple branch pipes, a flange plate is provided between the internal combustion engine and the internal combustion engine exhaust device, one end of each of the branch pipes is connected with a gas combination pipe, and the other end thereof is connected with the flange plate; a heat conversion device is provided in each branch pipe, a one-way flow heating channel and a high-temperature exhaust gas channel closed to each other are provided in the heat conversion device, and heating channels in the branch pipes are connected successively to form a water vapor channel;

one end of the water vapor channel is connected with the water tank (12) through the heating device water inlet connecting pipe (67), and the other end thereof is connected with the steam pot steam heating connecting pipe (61).

19. The onboard multi-functional thermal-insulation and explosion-proof pressure steamer according to claim 18, wherein the heat conversion device is characterized into that a one-way flow heating channel and a high-temperature exhaust gas channel independent from each other are provided in a double-deck chamber, the surface of the high-temperature exhaust gas channel has a fin-like structure, and the water vapor channel has a return-type structure.

20. The onboard multi-functional thermal-insulation and explosion-proof pressure steamer according to claim 19, wherein the heat conversion device has a wedge heat exchange structure, the high-temperature exhaust gas channel surface has an annular fin-like structure, and the water vapor channel is provided at the tube pass, and the high-temperature exhaust gas channel is provided at the center and the shell pass.

21. The onboard multi-functional thermal-insulation and explosion-proof pressure steamer according to claim 20, wherein the tube pass shape of the water vapor channel has a sinusoidal wave surrounding structure.

22. The onboard multi-functional thermal-insulation and explosion-proof pressure steamer according to claim 19, wherein the heat conversion device is a cylindrical tubular heat conversion device, and two ends thereof have a tapered structure, the water vapor channel is provided between the heat conversion device heating outer layer and the heat conversion device heating inner layer, the water vapor channel is a rectangular water vapor channel, the surfaces of the heat conversion device heating outer layer and the heat conversion device heating inner layer have a fin-like structure, the tube pass of the water vapor channel has an S-curve surrounding shape, the water vapor channel is provided at the tube pass, and the high-temperature exhaust gas channel is provided at an inner exhaust gas flow chamber and an outer exhaust gas flow chamber in the heat conversion device.

23. The onboard multi-functional thermal-insulation and explosion-proof pressure steamer according to claim 19, wherein the heat conversion device is rectangular, the water vapor channel is provided in the heat conversion device, a plate fin-like heating outer layer of the heat conversion device is provided on the upper and lower parts of the water vapor channel respectively, the tube pass of the water vapor channel has a plate return-type shape, the water vapor channel is provided at the tube pass, and the high-temperature exhaust gas channel is provided at the outer exhaust gas flow chamber between the heat conversion device heating outer layer and the branch pipe.

24. The onboard multi-functional thermal-insulation and explosion-proof pressure steamer according to claim 16, wherein the heating device is an electric heating steam generator, the electric heating steam generator comprises a steam shell and an electric heating pipe provided in the steam shell, a water inlet and a steam outlet are provided on the steam shell, the steam outlet is connected with the steam pot steam heating connecting pipe (61), and the water inlet is connected with the heating device water inlet connecting pipe (67).

* * * * *